R. F. BRESNAHAN.
ASPARAGUS KNIFE.
APPLICATION FILED MAY 29, 1908.
955,050.
Patented Apr. 12, 1910.
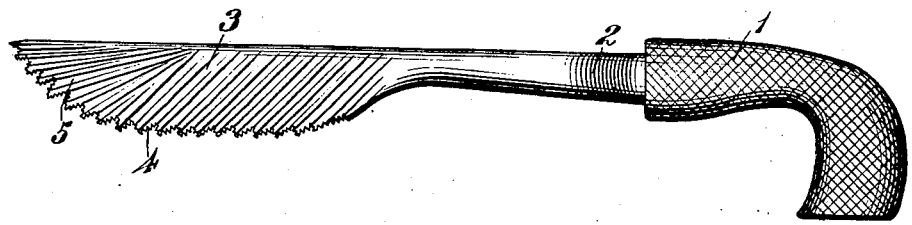
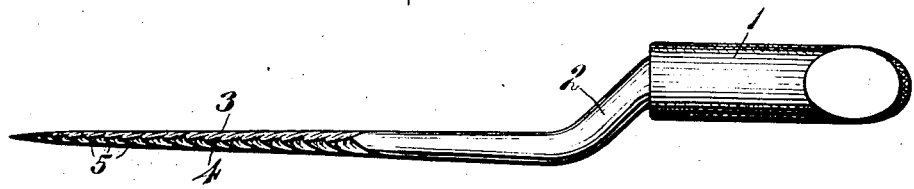

UNITED STATES PATENT OFFICE.

REMEMBRANCE FORDE BRESNAHAN, OF MARLBORO, NEW JERSEY.

ASPARAGUS-KNIFE.

955,050.  Specification of Letters Patent.  Patented Apr. 12, 1910.

Application filed May 29, 1908. Serial No. 435,722.

*To all whom it may concern:*

Be it known that I, REMEMBRANCE FORDE BRESNAHAN, a citizen of the United States, residing at Marlboro, in the county of Monmouth and State of New Jersey, have invented a new and useful Improvement in an Asparagus-Knife, of which the following is a specification.

This invention relates to a knife designed especially for cutting asparagus and the object of the invention is to overcome the difficulties of keeping a knife of the usual construction sharp enough to cut the tough skin of the plant, as in the cutting operation the knife is continually pushed into the ground and sand and other gritty substances which contact with the blade soon dull a smooth knife.

This invention consists of the novel features of construction hereinafter fully described, pointed out in the claim and shown in the accompanying drawings in which:—

Figure 1 is a side view of my knife. Fig. 2 is an edge view of my knife. Fig. 3 is a longitudinal section through a portion of the cutting blade.

In these drawings, 1 represents a knife handle from which extends a bent shank 2, giving the blade a drop of an inch or more when held in cutting position, and the shank portion 2 is comparatively narrow to avoid disturbing the soil more than is necessary by forcing into it a large shank. This shank widens out to form a thin cutting blade 3, which is provided upon its cutting edge with teeth 4, and this blade is grooved or fluted, the grooves 5 extending diagonally across the blade running toward the toothed edge of the blade toward and around the free end of the same about which the teeth are also carried.

The grooving of the blade forms the teeth 4, and each tooth 4 is notched or serrated along its edges thus forming a plurality of cutting teeth upon each of the teeth 4. By means of this construction the knife can be employed in sandy, gritty soil for a longer time without becoming dull than would be possible with a knife having smooth edged teeth.

Having thus fully described my invention, what I claim as new and desire to secure by Letters Patent, is:—

In an asparagus knife, a blade, said blade being provided with diagonally extending grooves forming teeth upon the cutting edge of the blade, the cutting edge of each tooth being serrated as and for the purpose set forth.

REMEMBRANCE FORDE BRESNAHAN.

Witnesses:
LEWIS S. PACKARD,
JOSEPH E. JOHNSON.